A. KLELL.
CONVERTIBLE AUTOMOBILE.
APPLICATION FILED SEPT. 21, 1910.
1,024,634.
Patented Apr. 30, 1912.
2 SHEETS—SHEET 1.
Fig. 1.
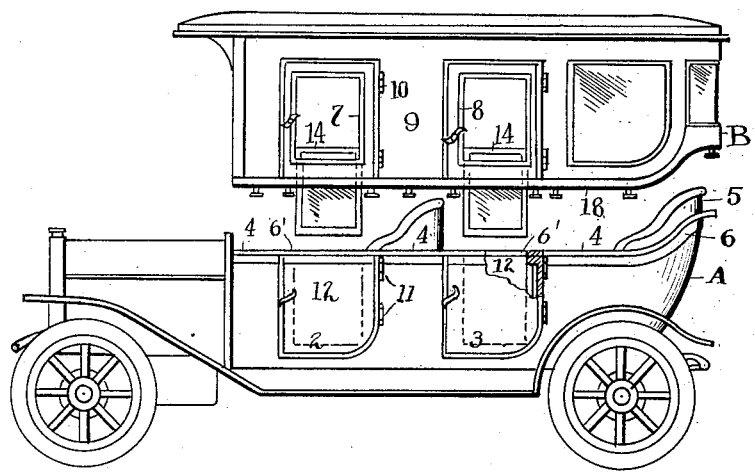
Fig. 2.
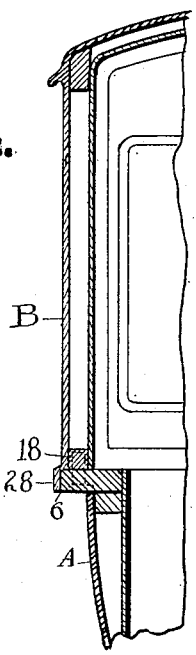
Fig. 3.
Fig. 4.
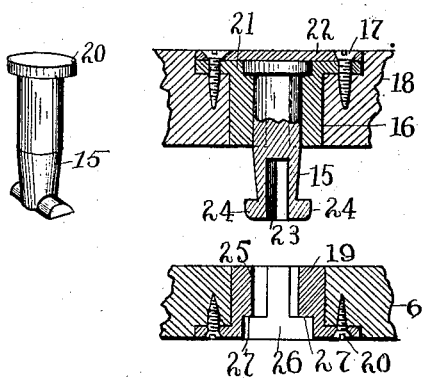
Fig. 5.
Fig. 6.
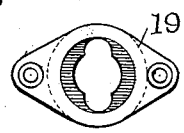
ATTEST
E. M. Fisher
H. H. Knapp
INVENTOR
ALBERT KLELL
BY Fisher & Moser
ATTYS.

A. KLELL.
CONVERTIBLE AUTOMOBILE.
APPLICATION FILED SEPT. 21, 1910.

1,024,634.

Patented Apr. 30, 1912.

2 SHEETS—SHEET 2.

ATTEST
E. M. Fisher
H. H. Knapp

INVENTOR
ALBERT KLELL
BY Fisher & Knapp
ATTYS.

UNITED STATES PATENT OFFICE.

ALBERT KLELL, OF WEST PARK, OHIO, ASSIGNOR OF ONE-HALF TO HENRY BARACS, OF CLEVELAND, OHIO.

CONVERTIBLE AUTOMOBILE.

1,024,634.  Specification of Letters Patent.  Patented Apr. 30, 1912.

Application filed September 21, 1910. Serial No. 582,968.

*To all whom it may concern:*

Be it known that I, ALBERT KLELL, a citizen of the United States, residing at West Park, in the county of Cuyahoga and State of Ohio, have invented certain new and useful Improvements in Convertible Automobiles, of which the following is a specification.

My invention relates to an improvement in convertible automobiles, and the improvement consists in the construction and arrangement of parts substantially as herein shown and described and more particularly pointed out in the claims.

In general, my object is to construct an improved vehicle body in separate parts adapting conversion of the vehicle into either an open or closed one, and being further constructed to promote convenient interchangeability of various styles and kinds of tops.

Figure 7:
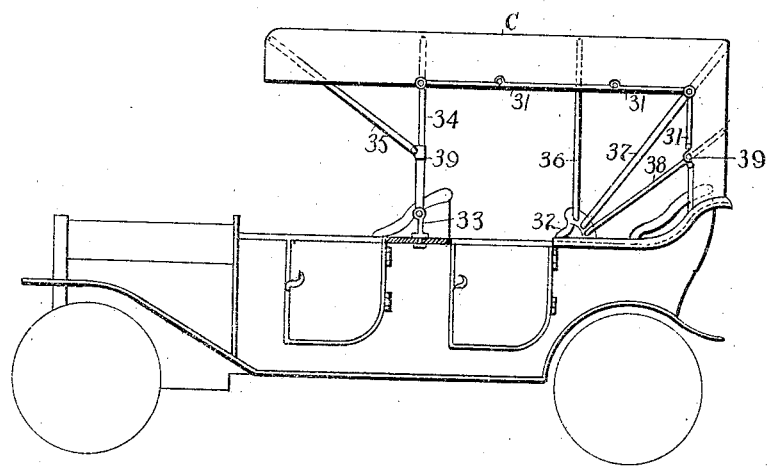
Figure 8:
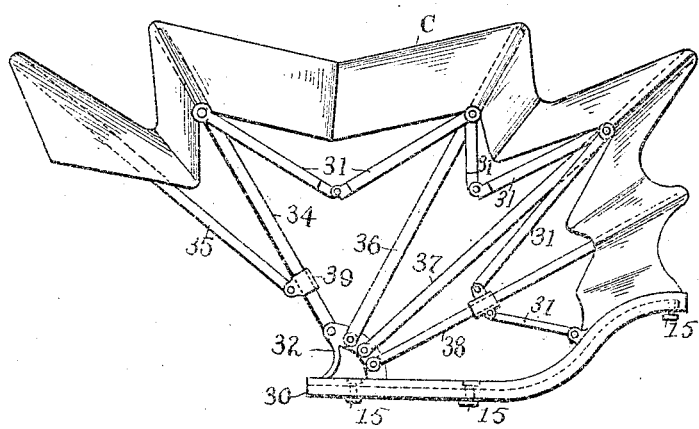

In the accompanying drawings, Figure 1 is a side elevation of an automobile having a touring car body, and showing a top separated therefrom and adapted to convert the same into a so-called Limousine body. Fig. 2 is a cross section of a portion of a cab top and body assembled. Fig. 3 is a perspective view of the locking bolt used in detachably connecting a top with the main body. Fig. 4 is a sectional view of the seating portion of the top with the locking bolt secured in place therein, and Fig. 5 is a sectional view of the locking barrel which co-acts with the parts seen in Fig. 4. Fig. 6 is a face view of either of the locking barrels shown in Figs. 4 and 5. Fig. 7 is a side elevation of a touring car body having a foldable top provided with similar locking connections between the parts, and Fig. 8 is a side elevation of the top partly folded.

As shown, body A has two seats inclosed by separate doors 2 and 3, respectively. The upper borders or edges of these doors form a continuation of the upper border or edge 4 of body A on straight lines at either side. This border is also continued at a higher elevation across the rear to conform with the upper edge of rear seat 5. Moreover, border 4 projects laterally from the sides of the body and also the doors to provide a flat seat for the detachable and interchangeable tops B and C, respectively, which are fastened thereto.

Referring first to top B two separate door sections 7 and 8, respectively, are hinged in the sides 9 thereof. These sections become extensions of doors 2 and 3 when top B is fastened upon body A and are interlocked with the bottom doors 2 and 3 to open and close therewith. To this end hinges 10 for each top section and hinges 11 of each bottom door are in alinement. In addition doors 2 and 3 have pockets 12 which open into their border portions 6', and the door extensions 7 and 8 have slidable window sashes 14 adapted to be lowered into said pockets when top B is mounted upon body A. Thus when the top is in place either of the doors may be opened with the sash either raised or lowered.

The means to lock the door parts together and the top B to body A comprise a series of locking bolts 15 rotatably seated in barrels 16 fastened by screws 17 within the bottom seating edge or border 18 of top B, and barrels 19 are secured by screws 20 at spaced intervals in body borders 6 and 6' and these are necessarily oppositely related to barrels 16 when attachment is made. Two sets of such locking devices are deemed sufficient for each sectional door, one at either side of sash 14. Each bolt 15 has a head 20 adapted to seat within a recess 21 in sleeve 16 and a plate 22 further confines the bolt within the sleeve when the parts are screwed in place by screws 17. However, bolt 15 is free to be rotated, and this is done by means of a key (not shown) which is adapted to enter an angular bore 23 within the bottom of the bolt. Each bolt is also provided with laterally extending lugs 24 at its lower end, and the walls of internally reduced bore 25 of barrel 19 have side channels 26 adapting lugs 24 to be entered into seating relation with shoulders 27 when the parts are assembled. A quarter turn of the bolt places the lugs at right angles to channels 26 and effects locking engagement against shoulders 27. Barrels 16 and 19 are identical in form and construction to permit bolt 15 to be entered therein from their upper ends, and in the former case, before plate 22 is assembled. These locking devices securely fasten top B in place and prevent rattling or shifting relation of the top in respect to the body, but are conveniently and quickly reached and unlocked when the need requires. Top B is preferably provided with a downwardly depending flange 28 at border seat 18 to inclose border 6 and seal and conceal the joints.

Top B may be replaced by a foldable top C, see Figs. 7 and 8, as similar locking bolts 15 are used in its angular border frame 30 which is adapted to rest upon border 6 of body A, the bolts being arranged and located to correspond both in number and position to locking sleeves 19 in said border 6. Folding top C comprises a series of knuckle-jointed bars 31 which pivotally connect with each other and with a series of bow members hinged to standards 32 and brackets 33, front and rear. Standard 33 represents a pivot support for front vertical bow 34 and inclined brace 35, and bracket 32 represents a rear pivot support for three bow members 36, 37 and 38, respectively. The knuckle bars 31 are pivotally united with all said bow or brace members excepting braces 35 and 38, which are engaged by slidable couplings 39 pivotally connected in the first instance with brace 35 and in the second instance with bars 31 at either side of bow 38. When folded, this top C may remain open at its sides or be further curtained or inclosed.

A covering 42 of leather or other suitable material is fastened to the folding frame parts by screws, buttons, or other suitable fastening means.

What I claim is:

1. An automobile body having a laterally projecting border about its top, a detachable top seated on said body and having a border portion overlapping the border on said top, and coincident barrels 16 and 19 respectively in said borders having annular recesses in their outer portions open outward, in combination with locking bolts adapted to extend bodily through said barrels and provided at one end with heads 20 adapted to rest in the recesses of the upper of said barrels and substantially T shaped lower ends adapted to be rotated and to be locked in the recesses in the lower of said barrels, and confining plates 22 over the heads of said bolts flush with the top surface of the top border.

2. In automobiles, a body having a laterally projecting border about its top provided with vertical openings therethrough at intervals open from beneath and barrels permanently fixed in said openings having recesses in their bottom, in combination with a top having a border portion seated upon said body border and provided with openings and barrels therein matching those in the said body border, the said barrels in both sets having bores substantially elliptical in cross section, and locking bolts through said barrels having substantially T shaped lower ends adapted to be rotated partway around and to lock in the said recesses in the lower of said barrels.

In testimony whereof I affix my signature in the presence of two witnesses.

ALBERT KLELL.

Witnesses:
F. C. MUSSUN,
E. M. FISHER.